(12) United States Patent
Ferraby

(10) Patent No.: US 7,690,592 B2
(45) Date of Patent: Apr. 6, 2010

(54) INTERLOCK SYSTEM

(75) Inventor: Robin Ferraby, Havant (GB)

(73) Assignee: Kenwood Limited, Hampshire (GB)

( * ) Notice: Subject to any disclaimer, the term of this patent is extended or adjusted under 35 U.S.C. 154(b) by 163 days.

(21) Appl. No.: 11/914,294

(22) PCT Filed: May 3, 2006

(86) PCT No.: PCT/GB2006/001630

§ 371 (c)(1),
(2), (4) Date: Nov. 13, 2007

(87) PCT Pub. No.: WO2006/123094

PCT Pub. Date: Nov. 23, 2006

(65) Prior Publication Data

US 2008/0230639 A1 Sep. 25, 2008

(30) Foreign Application Priority Data

May 17, 2005 (GB) .................................. 0509991.6

(51) Int. Cl.
*B02C 17/00* (2006.01)
*A47J 43/25* (2006.01)
(52) U.S. Cl. ..................................... 241/92; 241/101.01
(58) Field of Classification Search ................. 241/37.5, 241/92, 282.1, 282.3, 101.01, 101.1; 366/601
See application file for complete search history.

(56) References Cited

U.S. PATENT DOCUMENTS

| 5,567,049 A | * | 10/1996 | Beaudet et al. | 366/206 |
| 6,350,053 B1 | * | 2/2002 | Morin | 366/205 |
| 6,554,466 B1 | * | 4/2003 | Lee | 366/206 |
| 6,910,800 B2 | * | 6/2005 | Wu | 366/199 |
| 2002/0012288 A1 | * | 1/2002 | Masip et al. | 366/205 |
| 2002/0071340 A1 | * | 6/2002 | Juriga | 366/205 |

* cited by examiner

*Primary Examiner*—Faye Francis
(74) *Attorney, Agent, or Firm*—Martin Fleit; Paul D. Bianco; Fleit Gibbons Gutman Bongini & Bianco PL

(57) ABSTRACT

The invention provides an interlock system whereby operation of a domestic appliance such as a food processor containing an electric motor capable of driving a bladed or similar processing tool at relatively high speed is inhibited unless a vessel having a first or a second base configuration is securely mounted to the appliance so as to contain the tool; the vessel having a lid or cover intended to be in place for safe operation when the processing tool is driven by the motor. A vessel-supporting surface of the appliance carries several upstanding latches, each of which is formed with features capable of co-operating with vessels having either of the base configurations to temporarily latch either type of vessel operationally to the appliance. At least one of the latches is formed with first and second apertures allowing operational access for respective interlock actuators responsive to the lid or cover of a vessel being in place as intended, to an interlock switch whereby electrical current is permitted to flow to the motor only when a vessel having one or other of the different base configurations is latched to the appliance and the vessel is safely closed by its lid or cover.

15 Claims, 3 Drawing Sheets

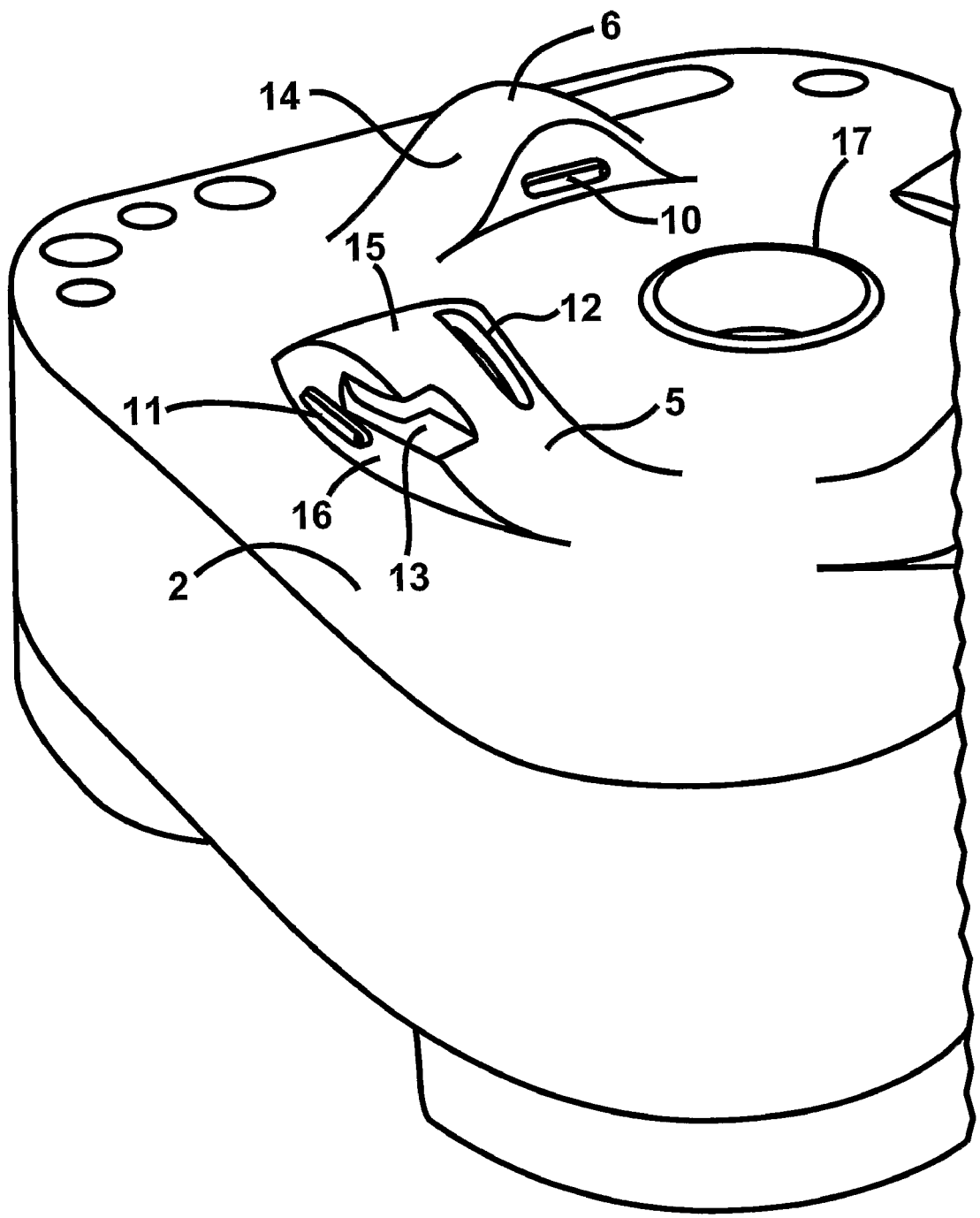

INTERLOCK SYSTEM

FIELD OF THE INVENTION

This invention relates to interlock systems, and it relates especially, though not exclusively, to such systems as are intended for use as safety measures for multi-purpose domestic electrical appliances designed for carrying out plural operations such as food processing, food mixing, blending and the like.

BACKGROUND OF THE INVENTION

It is well known that domestic electrical appliances incorporating moving parts and/or heating elements that could, under certain operational circumstances, cause harm to a user have interlock systems to protect users by preventing the flow of electric current to the prime mover or heating element when such operational circumstances occur. Thus, interlock systems are an essential feature of many domestic appliances, and their components need to satisfy demanding, and sometimes opposing, regulatory, operational and economic criteria. Hence difficulties arise in providing interlock systems that are sufficiently robust and reliable to meet user demands and comply with stringent regulatory stipulations, whilst being economical to produce and conforming to an acceptable aesthetic design.

BRIEF SUMMARY OF THE INVENTION

It is an object of this invention to provide an interlock system which addresses one or more of such difficulties and, in accordance with one example of the invention there is provided an interlock system comprising a housing containing a drive motor; the housing presenting a support surface for receptacles adapted to contain processing tools intended to be driven in rotation by said motor and each having a lid or cover intended to close said receptacle for safe operation when said processing tools are driven by said motor; said support surface supporting a plurality of discrete upstanding latch members distributed in a predetermined pattern thereon and each containing respective elements for temporarily latching to said housing receptacles having at least two different base configurations, wherein at least one of said latch members presents, by way of first and second apertures respectively, operational access for respective interlock actuators responsive to the said closure by said lids or covers of said receptacles, to an interlock switch control means disposed in said housing whereby electrical current is permitted to flow to said motor only when a receptacle having one or other of said different base configurations is latched to said housing and said receptacle so latched is safely closed by its lid or cover.

Preferably, the said pattern comprises a symmetrical distribution of said latch members around a substantially circular path. Such an arrangement provides for secure and well defined latching of receptacles to said housing.

In particularly preferred embodiments of the invention, four latch members are provided; disposed in orthogonal, diametrically-opposed pairs with respect to said substantially circular path.

It is further preferred that the latch members are so disposed in said pattern as to accommodate receptacles configured for both left- and right-handed operation.

In some preferred embodiments of the invention, the latch members comprise parts of bayonet fixing arrangements, intended to co-operate with complementary parts presented by the bases of said receptacles.

It is further preferred that the latch members all present smoothly curved and substantially symmetrical profiles with respect to said support surface of the housing.

In a particularly preferred embodiment of the invention, the said first and second apertures are provided respectively in upwardly and outwardly facing surfaces of said at least one latch member.

In all embodiments of the invention, it is preferred that the motor is located in said housing such that its drive axis is substantially perpendicular to said support surface and that the support surface is apertured to provide operational access to said shaft for driving said processing tools. Where the latch members are distributed around a substantially circular path as aforesaid, it is preferred that the aperture in said support surface is disposed coaxially with said path.

The latch members associated with one of said base configurations are preferably usable for latching to the housing a drive shaft extension for use with containers having another of said base configurations.

In any of the foregoing embodiments of the invention, the interlock actuators are preferably tongue- or prong-like devices capable of entering one or other of said first and second apertures in said at least one latch member.

It is preferred that the interlock actuators directly engage with an operating member of an interlock switch, and that the operating member is spring loaded to the safe condition in which said current flow is interrupted. In alternative embodiments, however, the interlock actuators may engage the distal end of a linkage or other operational connection to an interlock switch located within the housing and remotely from said at least one latch member.

BRIEF DESCRIPTION OF THE SEVERAL VIEWS OF THE DRAWING

In order that the invention may be clearly understood and readily carried into effect, certain embodiments thereof will now be described with reference to the accompanying drawings, of which:

FIG. 3 shows an overhead perspective view of part of the base housing and illustrates details of a latch member.

DETAILED DESCRIPTION OF THE INVENTION

Figure 2A:
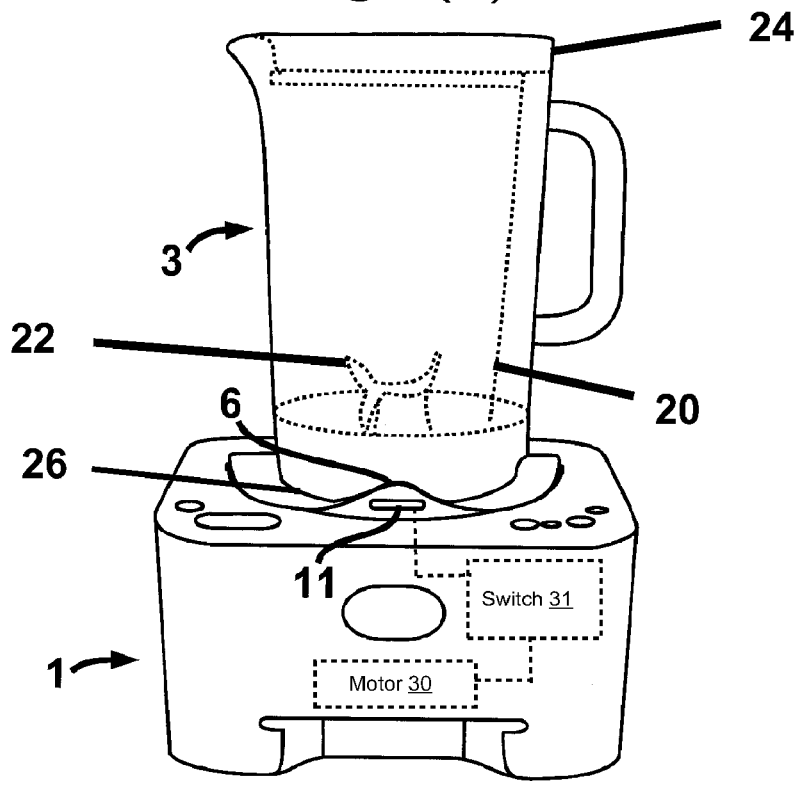
FIGS. 2(a) and 2(b) are partial diagrammatic/partial schematic views showing respectively perspective front elevations of the base housing with first and second receptacles having different base configurations latched thereto.
Figure 2B:
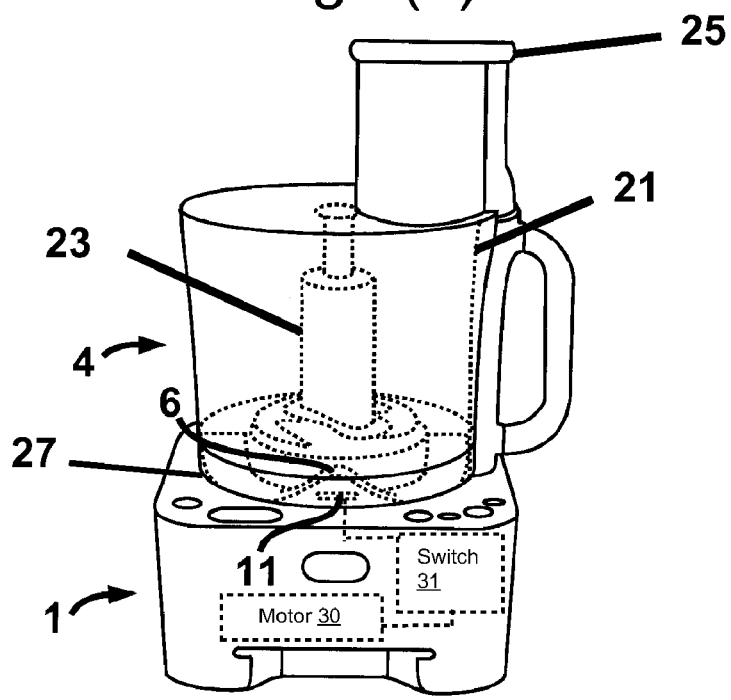

Referring now to the drawings, one example of the invention provides an interlock system comprising a base housing 1 containing a drive motor 30; the housing 1 presenting a substantially horizontal support surface 2 for goblet-like and bowl-like receptacles such as 3 and 4 respectively (see FIGS. 2(a) and 2(b)); each adapted to contain processing tools (22, 23) intended to be driven in rotation by said motor 30. The support surface 2 supports a plurality of discrete, upstanding latch members 5 to 8, distributed in a predetermined pattern; in this case equally spaced around a notional circular path 9 on the surface 2. Each latch member 5 to 8 contains respective elements such as 10, 11 for temporarily latching to the housing receptacles such as 3 and 4 having bases 26, 27 with base configurations of, in this example, two different and predetermined kinds.

As can best be seen from FIG. 3, at least one of said latch members 5 presents, by way of first and second apertures 12, 13 respectively, operational access for respective interlock actuators 20, 21 associated with the first and second receptacles 3, 4 to an interlock switch control means 31 disposed in the housing whereby electrical current is permitted to flow to the motor 30 only when a receptacle such as 3 or 4, having one or other of said different base configurations, is latched to said housing 1 and a lid or cover 24, 25 of the receptacle 3,4 is in place thereon and operatively coupled thereto as intended for safe operation of the appliance.

In this example, the predetermined pattern of distribution for the latch members 5 to 8 comprises a symmetrical distribution of said latch members around the substantially circular path 9. Such an arrangement provides for secure, well defined and user-friendly latching of receptacles to the housing 1. It is particularly preferred in such circumstances that four latch members (5 to 8) are provided; disposed in orthogonal, diametrically-opposed pairs (5, 7 and 6, 8) with respect to said substantially circular path. Such an arrangement provides optimal distribution of latching forces and a particularly beneficial symmetrical distribution of drive forces transmitted from the motor, via the latching members 5 to 8, to the base housing 1.

Conveniently, in some embodiments, the latch members 5 to 8 are disposed and configured so as to accommodate receptacles configured for both left- and right-handed operation.

As shown in the drawings, in this embodiment of the invention, the latching elements 10 and 11 carried by each of the latch members 5 to 8 respectively comprise component parts of bayonet fixing arrangements, intended respectively to co-operate with complementary parts presented by the bases of said receptacles.

Figure 1:
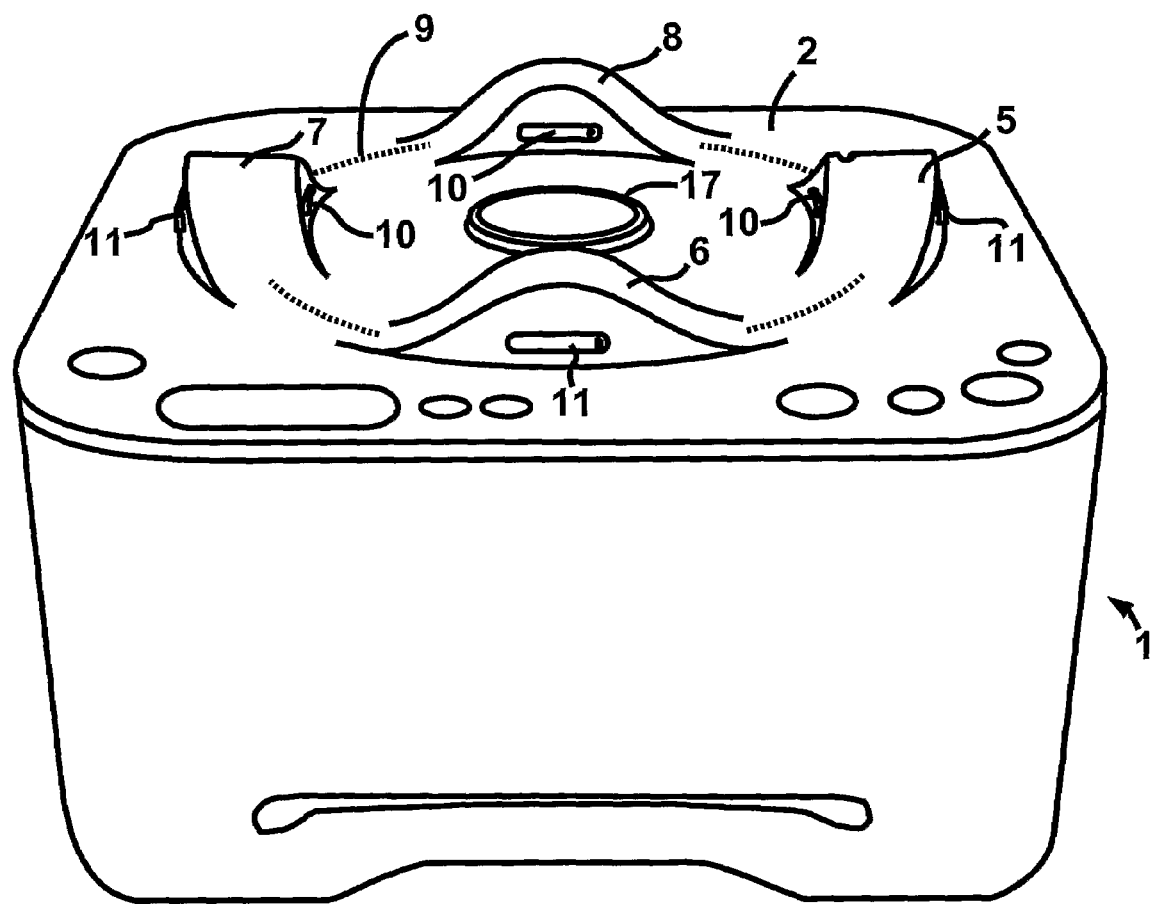
FIG. 1 shows, in perspective view, the base housing of an electrical appliance provided with elements of an interlock system in accordance with one example of the invention.

As can be seen from the drawings, especially FIGS. 1 and 3 thereof, the latch members 5 to 8 all present smoothly curved and substantially symmetrical profiles such as 14 with respect to said support surface of the housing. This is advantageous in several respects, but particularly in providing a sympathetic reception surface for the bases of receptacles to be attached thereto without snagging, and in presenting surfaces that are easy to keep clean.

The system of this example of the invention, therefore, provides a particularly efficient and beneficial means of latching receptacles 3 or 4 having bases 26, 27 with one or the other of two different differing base configurations to the base housing 1. Furthermore, as regards the provision of interlock facilities, the arrangement is further beneficial in permitting a single interlock switch control means 31, provided within the base housing 1 and coupled to the motor 30 in any convenient fashion, to be operated by actuators 20, 21 associated with receptacles of either base configuration by way of one or other of the first and second apertures 12 and 13 provided respectively in the upwardly and outwardly facing surfaces 15, 16 of (in this example) the latch member 5. It will be appreciated that apertures such as 12 and 13 can, if desired, be provided (alternatively or additionally) in one or more of the other latch members 5 to 8.

It is preferred that the motor 30 is located in the base housing 1 such that a drive axis (not shown) of the motor 30 is substantially perpendicular to said support surface 2 and that the support surface 2 is apertured, as at 17, to provide operational access to the shaft (not shown) for driving processing tools 22, 23 in the receptacles 3, 4. Where the latch members 5-8 are distributed around a substantially circular path 9 as shown, it is preferred that the motor shaft aperture 17 in the support surface 2 is disposed coaxially with the path 9.

The co-operative latching elements, such as 10, formed on latch members 5 to 8 and associated with one of said base configurations are preferably usable also for latching to the housing 1 a drive shaft extension (not shown) for use with containers having the other base configuration.

In any of the foregoing embodiments of the invention, the interlock actuators 20, 21 associated with the lids or covers 24, 25 of the various receptacles 3, 4 may comprise any convenient actuating device, such as a tongue- or prong-like device, which is directly or indirectly moved, in response to correct affixing of the lid or cover 24, 25 to the receptacle 3 or 4 in the manner prescribed for safe operation, into an extended position whereby the tongue- or prong-like member is rendered capable of entering one or other of the first and second apertures 12 or 13 in at least one of the latch members 5.

In operation, it is usual for the interlock actuators 20, 21 associated with the apertures 12 and 13 to directly engage with an operating member (not shown) of an interlock switch 31 located within the base housing 1, and that the operating member (not shown) is spring loaded or otherwise preferentially biased, towards a safe condition, in which current flow to the motor 30 is interrupted. In alternative embodiments, however, the interlock actuators 20, 21 may engage the distal end of a linkage or other operational connection (not shown) to an interlock switch (31) located within the housing 1 and remotely from said at least one latch member 5.

The invention claimed is:

1. An interlock system, comprising:
   a housing (1) containing an electrically powered drive motor (30); the housing presenting a support surface (2) capable of supporting thereon in latching engagement a base of a receptacle (3, 4) adapted to contain a processing tool (22, 23) intended to be driven in rotation by said motor (30) and having a lid or cover (24, 25) intended to close said receptacle (3, 4) for safe operation when said processing tool (22, 23) is driven by said motor (30); actuator means (21, 22) responsive to operative placement of said lid or cover (24, 25) upon said receptacle (3, 4) actuate an interlock switch control means (31) disposed in said housing (1) thereby permitting electrical current to flow to said motor (30) only when said receptacle (3, 4) is latched to said housing (1) and said receptacle (3, 4) so latched is safely closed by said lid or cover (24, 25);
   said support surface (2) supporting a plurality of discrete upstanding latch members (5, 6, 7, 8) distributed in a predetermined pattern thereon for latching said receptacle (3, 4) to the housing (1) for operation;
   each of said latch members containing respective elements (10, 11) for temporarily latching to said housing (1), at different times and by interaction with their respective bases (26, 27), a first receptacle (3) having a base (26) conforming to a first predetermined receptacle base configuration and a second receptacle (4) having a base (27) conforming to a second predetermined receptacle base configuration, different from the first receptacle base configuration, and in that at least one (5) of said latch members (5, 6, 7, 8) presents (a), by way of a first aperture (12), operational access for an actuator means responsive to the closure by the lid or cover (24) of said first receptacle (3) to actuate said interlock switch control means (31) and (b), by way of a second aperture (13), operational access for an actuator means (21) responsive to the closure by the lid or cover (25) of said second receptacle (4) to actuate said interlock switch control means (31), whereby said interlock switch control means (31) is actuated to permit the flow of electrical current to said motor (30) only when a receptacle (3, 4) having one of said predetermined receptacle base configurations is latched to said housing (1) and said receptacle (3, 4) so latched is safely closed by its lid or cover (24, 25).

2. The system according to claim 1 wherein said pattern comprises a symmetrical distribution of said latch members (5, 6, 7, 8) around a substantially circular path (9).

3. The system according to claim 2 wherein four latch members are provided; disposed in orthogonal, diametrically-opposed pairs (5, 7; 6, 8) with respect to said substantially circular path (9).

4. The system according to claim 2 wherein the aperture (17) in said support surface (2) is disposed coaxially with said path (9).

5. The system according to claim 1 wherein four latch members are provided; disposed in orthogonal, diametrically-opposed pairs (5, 7; 6, 8) with respect to said substantially circular path (9).

6. The system according to claim 1 wherein the latch members (5, 6, 7, 8) are so disposed in said pattern as to accommodate receptacles configured for both left- and right-handed operation.

7. The system according to claim 1 wherein the latch members (5, 6, 7, 8) all present smoothly curved and substantially symmetrical profiles (14) with respect to said support surface (2) of the housing.

8. The system according to claim 1 wherein the said first and second apertures (12, 13) are provided respectively in upwardly (15) and outwardly (16) facing surfaces of said at least one latch member (5).

9. The system according to claim 1 wherein the motor is located in said housing (1) such that its drive axis is substantially perpendicular to said support surface (2) and the support surface is apertured (17) to provide operational access to said shaft for driving said processing tools.

10. The system according to claim 9 wherein the aperture (17) in said support surface (2) is disposed coaxially with said path (9).

11. The system according to claim 1 wherein latch members associated with one of said base configurations are additionally usable for latching to the housing (1) a drive shaft extension for use with containers having another of said base configurations.

12. The system according to claim 1 wherein the interlock actuators engage the distal end of a linkage to an interlock switch located within the housing (1) and remotely from said at least one latch member (5).

13. An interlock system for safely connecting a first receptacle having a base with a first configuration, a removable lid, and an actuator means responding to operative placement of the lid upon the first receptacle, and for safely connecting a second receptacle having a base with a second configuration different than the first configuration, a removable lid, and an actuator means responding to operative placement of the lid upon the second receptacle; the interlock system comprising:

a housing configured to contain an interlock switch control means, said housing having a support surface configured to support in latching engagement the base of the first receptacle and the base of said second receptacle;

a discrete upstanding latch member for latching the first receptacle and the second receptacle at different times to the housing for operation, said discrete upstanding latch member being distributed in a predetermined pattern on said support surface; said discrete latch member containing respective elements for temporarily latching, at different times, the first receptacle and the second receptacle to said housing; said discrete upstanding latch member having a first aperture and a second aperture formed therein, said first aperture providing access to the actuator means of the first receptacle to actuate the interlock switch control means when the lid is secured on the first receptacle and the first receptacle is latched to said discrete upstanding latch member, said second aperture providing access to the actuator means of the second receptacle to actuate the interlock switch control means when the lid is secured on the second receptacle and the second receptacle is latched to said discrete upstanding latch member.

14. The appliance according to claim 13, further comprising a further discrete upstanding latch member for latching at least one of the first receptacle and the second receptacle at different times to the housing for operation, said further discrete upstanding latch member being and said discrete upstanding latch member being distributed in a predetermined pattern on said support surface.

15. An appliance, comprising:
a motor;
an interlock switch control means being connected to said motor, said interlock switch control means being configured to switch said motor on and to switch said motor off;
a first receptacle having a base with a first configuration, a removable lid, and an actuator means responding to operative placement of the lid upon the first receptacle;
a second receptacle having a base with a second configuration different than the first configuration, a removable lid, and an actuator means responding to operative placement of the lid upon the second receptacle;
a housing contain said motor and said interlock switch control means, said housing having a support surface configured to support, at different times, said base of said first receptacle and said base of said second receptacle; and
a plurality of discrete upstanding latch members for latching the first receptacle and the second receptacle at different times to the housing for operation, said plurality of discrete upstanding latch members being distributed in a predetermined pattern on said support surface; at least one of said plurality of discrete latch members containing respective elements configured to latch temporarily, at different times, said first receptacle and said second receptacle to said housing; said at least one of said plurality of discrete upstanding latch members having a first aperture and a second aperture formed therein, said first aperture providing access to said actuator means of said first receptacle to actuate said interlock switch control means when said lid is secured on said first receptacle and said first receptacle is latched to said at least one of said plurality of discrete upstanding latch members, said second aperture providing access to the actuator means of said second receptacle to actuate the interlock switch control means when said lid is secured on said second receptacle and said second receptacle is latched to said at least one of said plurality of discrete upstanding latch members;
said actuator means of said first receptacle not actuating said interlock switch control means to turn said motor on when said first receptacle is latched to said at least one of said plurality of discrete upstanding latch members and said lid is not secured on said first receptacle;
said actuator means of said second receptacle not actuating said interlock switch control means to turn said motor on when said second receptacle is latched to said at least one of said plurality of discrete upstanding latch members and said lid is not secured on said second receptacle.

* * * * *